United States Patent
Kim et al.

(10) Patent No.: US 10,775,664 B2
(45) Date of Patent: Sep. 15, 2020

(54) DISPLAY DEVICE HAVING BEZEL PATTERN AND METHOD OF MANUFACTURING THE SAME

(71) Applicant: LG DISPLAY CO., LTD., Seoul (KR)

(72) Inventors: SungHee Kim, Paju-si (KR); JinWuk Kim, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/016,954

(22) Filed: Jun. 25, 2018

(65) Prior Publication Data

US 2019/0018280 A1    Jan. 17, 2019

(30) Foreign Application Priority Data

Jul. 13, 2017 (KR) .................. 10-2017-0089127

(51) Int. Cl.
| | |
|---|---|
| *G02F 1/1335* | (2006.01) |
| *G02F 1/1333* | (2006.01) |
| *G09G 3/30* | (2006.01) |
| *G02F 1/35* | (2006.01) |

(52) U.S. Cl.
CPC .. *G02F 1/133512* (2013.01); *G02F 1/133308* (2013.01); *G09G 3/30* (2013.01); *G02F 2001/3505* (2013.01); *G02F 2201/08* (2013.01); *G02F 2201/40* (2013.01); *G05B 2219/37583* (2013.01)

(58) Field of Classification Search
CPC ............... G02F 2001/3505; G02F 1/133512
See application file for complete search history.

(56) References Cited

U.S. PATENT DOCUMENTS

| | | | |
|---|---|---|---|
| 10,227,498 B2 | 3/2019 | Park et al. | |
| 2009/0173438 A1* | 7/2009 | Takeuchi | C07C 323/22 156/275.5 |
| 2014/0043569 A1* | 2/2014 | Yabuta | G06F 3/041 349/104 |
| 2015/0241604 A1* | 8/2015 | Minari | G02F 1/133502 428/141 |
| 2016/0145449 A1 | 5/2016 | Hilgers | |
| 2016/0259241 A1* | 9/2016 | Yang | G02B 5/201 |
| 2016/0289370 A1* | 10/2016 | Son | C09J 163/00 |
| 2018/0120498 A1* | 5/2018 | Tanaka | G02B 6/0056 |

FOREIGN PATENT DOCUMENTS

| | | |
|---|---|---|
| CN | 102050930 B | 7/2012 |
| CN | 104122749 A | 10/2014 |
| CN | 103091916 B | 12/2015 |
| CN | 104620138 B | 5/2017 |
| CN | 10688959 B | 8/2019 |
| KR | 10-2016-0025009 A | 3/2016 |
| KR | 10-2017-0011782 A | 2/2017 |

* cited by examiner

*Primary Examiner* — Michael H Caley
*Assistant Examiner* — Jonathan Y Jung
(74) *Attorney, Agent, or Firm* — Birch, Stewart, Kolasch & Birch, LLP

(57) ABSTRACT

Provided is a display device. The display device includes a display panel including a display area where an image is displayed and a non-display area surrounding the display area, a light blocking layer disposed in the non-display area and on the display panel, and a primer layer disposed between the display panel and the light blocking layer, and configured to planarize the display panel. Thus, it is possible to provide a borderless display device having an excellent appearance with minimized defects in a bezel pattern caused by foreign materials.

16 Claims, 9 Drawing Sheets

DISPLAY DEVICE HAVING BEZEL PATTERN AND METHOD OF MANUFACTURING THE SAME

CROSS-REFERENCE TO RELATED APPLICATION

This application claims the priority of Korean Patent Application No. 10-2017-0089127 filed on Jul. 13, 2017, in the Korean Intellectual Property Office, the disclosure of which is incorporated herein by reference in its entirety.

BACKGROUND OF THE INVENTION

Field of the Invention

The present disclosure relates to a display device and a method of manufacturing the same, and more particularly, to a display device having a bezel pattern in a non-display area and a method of manufacturing the same.

Description of the Related Art

Recently, as the society enters an information society, a display field which visually represents an electrical information signal is rapidly being developed. In accordance with the rapid development, various display devices having excellent performance such as thin thickness, light weight, and low power consumption properties have been developed.

Specific examples of the above-mentioned display device may include a liquid crystal display device (LCD), a plasma display panel device (PDP), a field emission display device (FED), an organic light emitting display device (OLED), and the like.

A display device can be divided into a display area where an image is displayed and a non-display area, also known as bezel area, where the image is not displayed. In general, sub-pixels that represent colors are disposed in the display area and pixel driving circuits configured to drive a sub-pixel are disposed in the respective sub-pixels. The bezel area refers to an area covered by a black bezel pattern or a case, and driving circuits configured to transfer external signals to pixels are disposed in the bezel area.

Recently, there have been made attempts to reduce the size of the entire display device and provide a beautiful appearance by minimizing the size of the bezel area by various methods. Particularly, such attempts include a borderless design in which a panel occupies the entire surface of the display device without covering the bezel area by using a case. In this instance, the bezel area may be formed by printing a bezel ink composition on the panel substrate.

Bezel printing methods generally include a thermo-curable method of curing the printed bezel ink composition through a high-temperature heat treatment and a photo-curable method of curing the printed bezel ink composition using light energy. However, the thermo-curable method further requires a process of inputting the display panel in an oven for the high-temperature heat treatment and a process of baking the bezel ink composition. Thus, a process time and a process tact can be increased. Further, various materials such as plastic may be used to implement a flexible display device. However, a plastic material has an insufficient heat-resistant property, and thus the substrate formed from the plastic material can be damaged in the instance where the bezel is printed by the thermos-curable method. Therefore, the photo-curable method capable of simultaneously performing coating and curing and also curing the bezel ink composition in a shorter time than the thermoscurable method can be more usefully used.

Meanwhile, when a bezel pattern is formed on the substrate by bezel printing, the bezel pattern may be defective due to foreign materials remaining on the substrate. That is, the bezel ink composition may not be uniformly coated due to the foreign materials on the panel substrate or dewetting of the bezel ink composition may occur during a curing process. Thus, the bezel pattern may not be formed in some areas. In order to suppress such defects caused by foreign materials, a cleaning process for reducing the generation of foreign materials may be added before a bezel pattern is formed. However, despite the cleaning process, defects have occurred continuously in the bezel pattern due to micro foreign materials formed of organic materials and having a size of about 10 nm or less.

SUMMARY OF THE INVENTION

An object to be achieved by the present disclosure is to provide a borderless display device having an excellent appearance by minimizing the occurrence of defects in a bezel pattern caused by micro foreign materials having a size of about 10 nm or less during a bezel printing process.

Further, another object to be achieved by the present disclosure is to reduce a process time and a process tact by excluding an additional cleaning process during the bezel printing process.

Objects of the present disclosure are not limited to the above-mentioned objects, and other objects, which are not mentioned above, can be clearly understood by those skilled in the art from the following descriptions.

According to an aspect of the present disclosure, there is provided a display device. The display device includes a display panel including a display area to display an image and a non-display area surrounding the display area. The display device further includes a light blocking layer disposed in the non-display area and on the display panel, and a primer layer disposed between the display panel and the black light blocking layer, and configured to planarize the display panel.

According to another aspect of the present disclosure, there is provided a method of manufacturing a display device having a bezel pattern. The method of manufacturing a display device having a bezel pattern includes preparing a first coating layer by coating a radical-curable primer composition on a non-display area of a substrate. The method of manufacturing a display device having a bezel pattern further includes preparing a primer layer by photo-curing the first coating layer and preparing a second coating layer by coating a cation-curable ink composition including a colorant on the primer layer. The method of manufacturing a display device having a bezel pattern further includes preparing a bezel pattern by photo-curing the second coating layer.

According to another aspect of the present disclosure, there is a provided a display device. The display device includes a display panel including a display area to display an image and a non-display area surrounding the display area; micro foreign materials having a size of about 10 nm or less, and disposed on the display panel; and a primer layer disposed on display panel to fully cover the micro foreign materials.

Other detailed matters of the example embodiments are included in the detailed description and the drawings.

According to the present disclosure, a primer layer is formed before a bezel printing process. Thus, it is possible to minimize defects in the bezel pattern caused by foreign materials.

Further, according to the present disclosure, it is possible to provide a borderless display device having an excellent appearance.

Furthermore, according to the present disclosure, an additional cleaning process can be excluded during the bezel printing process. Thus, it is possible to reduce a process time and a process tact.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1A:
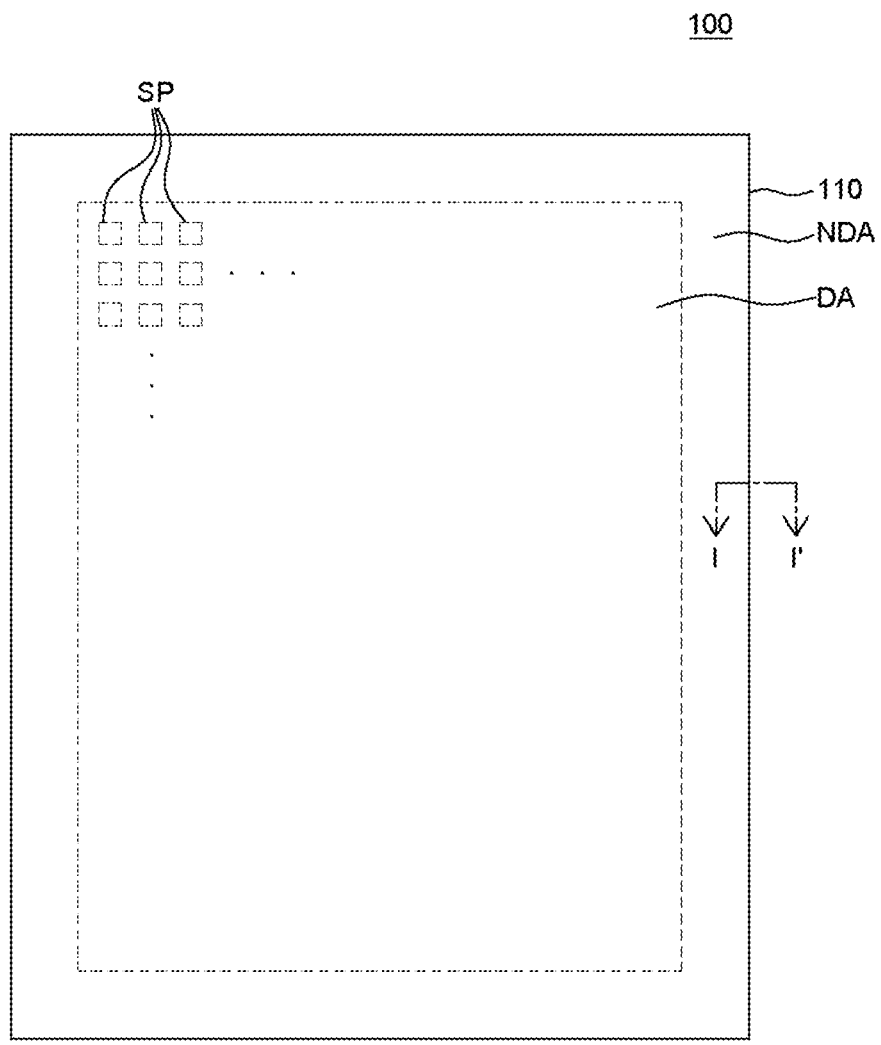
FIG. 1A is a schematic plan view illustrating a display device according to an example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiment disclosed herein but will be implemented in various forms. The example embodiments are provided by way of example only so that a person of ordinary skill in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated, such as about 1% to about 10%.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for the convenience of description, and the present disclosure is not limited to the size and the thickness of the component illustrated.

The features of various embodiments of the present disclosure can be partially or entirely adhered to or combined with each other and can be interlocked and operated in technically various ways as understood by those skilled in the art, and the embodiments can be carried out independently of or in association with each other.

Hereinafter, various example embodiments of the present disclosure will be described in detail with reference to accompanying drawings.

Figure 1B:
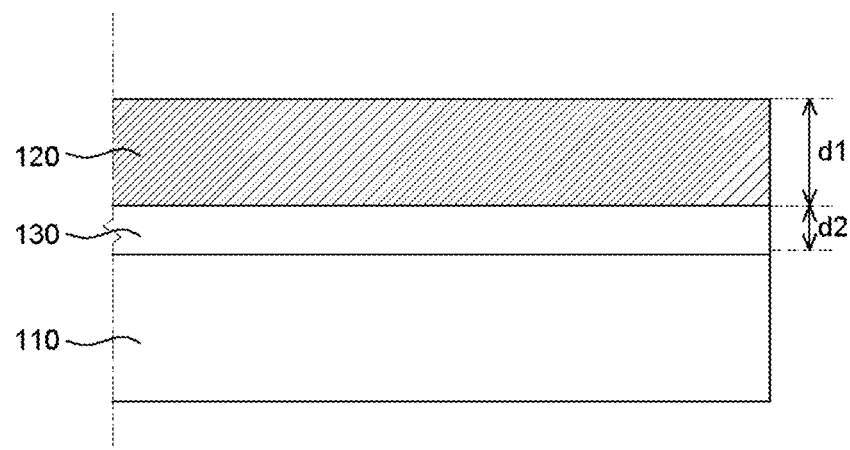
FIG. 1B is a schematic cross-sectional view taken along a line I-I' of FIG. 1A.

FIG. 1A is a schematic plan view illustrating a display device according to an example embodiment of the present disclosure. FIG. 1B is a schematic cross-sectional view taken along a line I-I' of FIG. 1A. FIG. 1B is a cross-sectional view schematically illustrating a bezel pattern area in the display device illustrated in FIG. 1A.

Referring to FIG. 1A and FIG. 1B, a display device 100 according to an example embodiment of the present disclosure includes a display panel 110, a primer layer 130, and a light blocking layer (or a black light blocking layer) 120.

The display panel 110 may be configured to display an image and may be a liquid crystal panel, an electroluminescent display panel, an organic light emitting display panel, or a plasma display panel. Further, the display panel 110 may be a flat display panel 110 having a flat surface or may be a flexible panel having flexibility. The display panel 110 may include an upper substrate, a lower substrate, and a display element, but is not limited thereto.

The lower substrate may be a base substrate configured as an array substrate. Although not specifically illustrated in FIG. 1A, a plurality of pixels SP are defined on the lower substrate. Further, the lower substrate may include a plurality of pixel electrodes, a common electrode, and a plurality of thin film transistors (TFT) electrically connected to the plurality of pixel electrodes, respectively.

The upper substrate may be a base substrate configured as a color filter substrate. Although not specifically illustrated in FIG. 1A, a color filter layer for implementing colors by the display device 100 may be formed on the upper substrate.

The display element may be disposed between the lower substrate and the upper substrate. If the display panel 110 is a liquid crystal display panel 110, the display element may be a liquid crystal layer. Meanwhile, if the display panel 110 is a light emitting display panel 110, the display element may be an organic light emitting diode or an electroluminescent element. However, the display element is not limited thereto. The display element may be defined variously depending on the kind of the display device 100.

The display panel 110 may further include a cover substrate. The cover substrate refers to a substrate formed on the periphery of the display panel 110 and protects the display panel 110 and the display device 100 including the display panel 110. The cover substrate may be formed of glass or may be formed of a plastic material such as polymethylmethacrylate (PMMA), polyethyleneterephthalate (PET) and polycarbonate (PC) to implement the flexible display device 100. Meanwhile, the upper substrate may function as a cover substrate without the separate cover substrate. Other transparent materials may be used as the cover substrate.

Referring to FIG. 1A, the display panel 110 may include a display area DA in which an image is displayed and a non-display area NDA which surrounds the display area DA and in which the image is not displayed. In the display area DA, the display element configured to emit light may be disposed. In the non-display area NDA, various driving circuits configured to transfer signals to the display element may be disposed. In the non-display area NDA, the black light blocking layer 120 may be disposed.

The black light blocking layer 120 may be formed in the non-display area NDA of the display panel 110. In this instance, the black light blocking layer 120 may also be referred to as a bezel pattern. The black light blocking layer 120 may be formed entirely or partially on the non-display area NDA of the display panel 110. In this instance, the black light blocking layer 120 may be disposed on an upper surface or a lower surface of the display panel 110. If the display panel 110 further includes the cover substrate, the black light blocking layer 120 may be disposed on the cover substrate. If the display panel 110 does not include the cover substrate, the black light blocking layer 120 may be disposed on the upper substrate.

The black light blocking layer 120 may be disposed in the non-display area NDA along the circumference of the display area DA. An area where the black light blocking layer 120 may be formed may be referred to as a bezel area. In this instance, if the black light blocking layer 120 is formed on the entire non-display area NDA, the bezel area can be considered as the same as the non-display area NDA.

The black light blocking layer 120 may be formed by printing a bezel ink composition. Bezel printing methods for forming the black light blocking layer 120 may include a thermo-curable method of curing the printed bezel ink composition through a high-temperature heat treatment and a photo-curable method of curing the printed bezel ink composition using light energy. Particularly, the photo-curable method capable of simultaneously performing coating and curing and also curing the bezel ink composition in a shorter time than the thermos-curable method may be more preferable, but such is not required.

In this instance, the bezel ink composition for forming the black light blocking layer 120 may be a photo-curable ink composition. The photo-curable ink composition refers to an ink composition which may be cured by absorbing ultraviolet (UV) rays or visible rays, e.g., light having a wavelength of from about 360 nm to 410 nm. Other wavelengths of light or other sources of energy, such as heat, may also be used.

The bezel ink composition may be a radical-curable composition or a cation-curable composition. However, the radical-curable composition does not have excellent adhesiveness to a glass substrate and is sensitive to oxygen and thus has a problem about curing properties. In contrast, the cation-curable composition has low curing shrinkage, is odorless and less affected by oxygen as compared with the radical-curable composition. Therefore, the cation-curable composition may be more preferably used as the bezel ink composition, but the present disclosure is not limited thereto.

More specifically, the cation-curable composition as the bezel ink composition for forming the black light blocking layer 120 may include a colorant, a cationically polymerizable compound, a cationic photoinitiator, and a solvent.

The colorant may be a pigment, a dye, or a mixture thereof, and is not limited thereto as long as it can express various colors as necessary.

For example, carbon black, graphite, metal oxide, an organic black pigment, and the like may be used as the colorant. The amount of the colorant may be from about 0.1 weight % to about 15 weight % with respect to the total weight of the bezel ink composition. If the amount of the colorant is less than about 0.1 weight %, the light transmittance of the black light blocking layer 120 may be increased. If the amount of the colorant is more than about 15 weight %, the viscosity of the bezel ink composition may be excessively increased.

The cationically polymerizable compound may be an epoxy-based compound. Particularly, the cationically polymerizable compound may be a mixture of one or more compounds selected from cycloaliphatic epoxy compounds. In this instance, the cycloaliphatic epoxy compounds refer to compounds including one or more epoxidized aliphatic ring groups.

For example, the epoxy-based compound may be dicyclopentadiene dioxide, limonene dioxide, (3,4-epoxycyclohexyl)methyl-3,4-epoxycyclohexane carboxylate, 3-vinylcyclohexene oxide, bis(2,3-epoxycyclopentyl)ether, bis(3,4-epoxycyclohexylmethyl)adipate, bis(3,4-epoxy-6-methylcyclohexylmethyl)adipate, (3,4-epoxycyclohexyl)methylalcohol, 3,4-epoxy-6-methylcyclohexyl)methyl-3,4-epoxy-6-methylcyclohexanecarboxylate, ethyleneglycol bis (3,4-epoxycyclohexyl)ether, 3,4-epoxycyclohexane carboxylic acid ethyleneglycol diester, or (3,4-epoxycyclohexyl) ethyltrimethoxysilane, but is not limited thereto.

Meanwhile, the cationically polymerizable compound may further include an oxetane compound as a cationically polymerizable monomer. For example, the oxetane compound may be ethyl-3-hydroxymethyl oxetane, 1,4-bis[(3-ethyl-3-oxetanyl)methoxymethyl]benzene, 3-ethyl-3-(phenoxymethyl)oxetane, di[(3-ethyl-3-oxetanyl)methyl]ether, 3-ethyl-3-(2-ethylhexyloxymethyl)oxetane, or phenol novolac oxetane, but is not limited thereto.

In this instance, the amount of the cationically polymerizable compound may be from about 8 weight % to about 50 weight % with respect to the total weight of the bezel ink composition. If the amount of the cationically polymerizable compound satisfies the above range, the bezel ink composition can have sufficient coatability and sensitivity.

The cationic photoinitiator may be an iodine salt photoinitiator. The iodine salt photoinitiator enables polymerization in which monomers having unsaturated double bonds in an ink composition react to form a polymer during a UV curing process.

The cationic photoinitiator may be included in an amount of from about 1 weight % to about 15 weight % with respect to the total weight of the bezel ink composition. If the amount of the photoinitiator satisfies the above range, the photoinitiator can be completely dissolved in the bezel ink composition and enables the occurrence of sufficient polymerization.

The solvent may include one or more members selected from the group consisting of methyl ethyl ketone, methylcellosolve, ethylcellosolve, ethyleneglycol dimethyl ether, ethyleneglycol diethyl ether, propyleneglycol dimethyl ether, propyleneglycol diethyl ether, diethyleneglycol dimethylether, diethyleneglycol diethylether, diethyleneglycol methyl ethyl ether, 2-ethoxy propanol, 2-methoxy propanol, 2-ethoxy ethanol, 3-methoxy butanol, cyclohexanone, cyclopentanone, propyleneglycol methyl ether acetate, propyleneglycol ethyl ether acetate, 3-methoxybutyl acetate, ethyl 3-ethoxypropionate, ethylcellosolve acetate, methylcellosolve acetate, butyl acetate, and dipropyleneglycol monomethyl ether, but is not limited thereto.

Preferably, though not required, the amount of the solvent may be from about 10 weight % to about 50 weight % with respect to the total weight of the ink composition. If the amount of the solvent is more than about 50 weight %, the curing sensitivity may be decreased. If the amount of the solvent is less than about 10 weight %, the coatability may be decreased.

The bezel ink composition may have a viscosity of from about 10 cP to about 40 cP at 25° C., but is not limited thereto. If the viscosity of the bezel ink composition satisfies the above range, the bezel ink composition is suitable for an inkjet process.

Further, preferably, the bezel ink composition may have a surface tension of from about 20 dyne/cm to about 30 dyne/cm, but is not limited thereto.

Meanwhile, the black light blocking layer 120 formed of the above-described bezel ink composition may have a thickness d1 of from about 1 µm to about 10 µm, but is not limited thereto. If the thickness d1 of the black light blocking layer 120 is less than about 1 µm, it is difficult for the black light blocking layer 120 to block light emitted from the display element. If the thickness d1 of the black light blocking layer 120 is about 10 µm or more, the time required forming the black light blocking layer 120 may be increased, and, thus, the overall process tact may be increased.

The primer layer 130 may be formed in the non-display area NDA of the display panel 110. The primer layer 130 is disposed between the display panel 110 and the black light blocking layer 120.

The primer layer 130 may be disposed on the display panel 110 and functions to compensate for foreign materials or impurities generated on the display panel 110 during a manufacturing process of the display device 100. That is, the primer layer 130 may cover the unintended foreign materials generated during the manufacturing process and thus flattens or planarizes the non-display area NDA of the display panel 110. Therefore, the black light blocking layer 120 can be uniformly formed in the non-display area NDA of the display panel 110 without defects. Foreign materials or impurities may be dust, pieces of the substrate, or any material that are unintendedly included or leftovers from a previous process.

The primer layer 130 may be formed by curing a primer composition. In this instance, preferably, though not required, the primer composition for forming the primer layer 130 may be a photo-curable composition like the above-described bezel ink composition. Further, the primer composition may be a radical-curable composition or a cation-curable composition like the bezel ink composition.

In this instance, preferably, though not required, the primer composition may be the radical-curable composition. More specifically, as described above, it is desirable to use the cation-curable composition for forming a black light blocking layer formed on a primer layer since the cation-curable composition has low curing shrinkage, is odorless and less affected by oxygen. However, the cation-curable composition for forming the black light blocking layer has a lower curing rate than the radical-curable composition, and even when light irradiation is stopped, polymerization does not stop but continuously proceeds, which is called dark reaction. That is, due to a low curing rate of the cation-curable composition, dewetting may occur. In this instance, when a part of the primer layer coated on an area where foreign materials are positioned is removed, a display panel is exposed. In order to solve the dewetting problem, preferably, though not required, the radical-curable composition having a high curing rate may be used as a primer composition for forming the primer layer.

Specifically, the primer composition for forming the primer layer 130 may include a radically polymerizable compound, a radical photoinitiator, and a solvent.

The radically polymerizable compound may be an acryl-based compound. Particularly, the radically polymerizable compound may be an acryl-based monomer, oligomer or polymer having one or more functional acrylate groups or methacrylate groups or an acryl-based monomer, oligomer or polymer having a urethane group, but is not limited thereto.

The acryl-based compound may have two or more functional acrylate groups and particularly preferably two to six functional acrylate groups. Other acryl-based compounds or functional acrylate groups may be used.

For example, the acryl-based compound may be butylacrylate, methacrylic acid, vinylacetate, butylacetate, methacrylic acid, methyl methacrylate, a styrene polymer, methyl methacrylate, a methyl methacrylate-based polymer, acrylic acid, hydroxyethyl methacrylate, acrylic acid butyl ester, methacrylic acid methyl ester, or a vinyl acetate-acrylic acid copolymer, but is not limited thereto.

In this instance, the amount of the radically polymerizable compound may be from about 10 weight % to about 50 weight % with respect to the total weight of the primer composition. If the amount of the radically polymerizable compound satisfies the above range, the primer composition can have sufficient coatability and sensitivity to light.

The radical photoinitiator may be activated by UV or visible rays. For example, the radical photoinitiator may be 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl(2,4,6-trimethylbenzoyl)-phosphine oxide or bis(2,4,6-trimethylbenzoyl)-phenylphosphine oxide, but is not limited thereto. Besides, radical photoinitiators currently on the market may include Irgacure 184, Irgacure 500, Irgacure 651, Irgacure 369, Irgacure 907, Darocur 1173, DarocurMBF, Irgacure 819, Darocur TPO, Irgacure 907, Esacure KIP 100F, ITX, and the like. These radical photoinitiators may be used alone or as a mixture of two or more thereof.

The radical photoinitiator may be included in an amount of from about 1 weight % to about 15 weight % with respect to the total weight of the primer composition. If the amount of the radical photoinitiator satisfies the above range, the radical photoinitiator can be completely dissolved in the primer composition and enables the occurrence of sufficient polymerization.

The solvent may be an organic solvent and preferably, though not required, a polar solvent. For example, suitable examples of the solvent may include aliphatic alcohol, glycol ether, cycloaliphatic alcohol, aliphatic ester, cycloaliphatic ester, a halogenated aliphatic compound, a halogenated cycloaliphatic compound, a halogenated aromatic compound, aliphatic ester, water, and alcohol such as isopropyl alcohol (IPA) or ethanol, but is not limited thereto.

Preferably, though not required, the amount of the solvent may be from about 0.1 weight % to about 40 weight % with respect to the total weight of the primer composition. If the amount of the solvent is more than about 40 weight %, the curing sensitivity may be decreased. If the amount of the solvent is less than about 0.1 weight %, the coatability may be decreased.

The primer composition may have a viscosity of from about 3 cP to about 15 cP at 25° C., but is not limited thereto. If the viscosity of the primer composition satisfies the above range, the primer composition is more suitable for fast photo-curing.

Further, preferably, the primer composition may have a surface tension of from about 20 dyne/cm to about 50 dyne/cm, but is not limited thereto.

The primer layer 130 may have a thickness d2 of from about 10 nm to about 200 nm and from about 50 nm to about 100 nm. If the thickness d2 of the primer layer 130 is about 10 nm or more, the primer layer 130 can sufficiently cover micro foreign materials formed on the display panel 110. Thus, the black light blocking layer 120 can be uniformly formed. That is, it is possible to suppress coating defects during bezel printing for forming the black light blocking layer 120. Meanwhile, if the thickness d2 of the primer layer 130 is about 200 nm or less, the primer composition can be rapidly cured during a process for forming the primer layer 130. Thus, it is possible to reduce the process time.

As described above, in the display device 100 according to an example embodiment of the present disclosure, it is possible to suppress coating defects of the black light blocking layer 120 caused by foreign materials present on the display panel 110 during a bezel printing process for forming the black light blocking layer 120 on the display panel 110. To this end, the primer layer 130 is disposed between the display panel 110 and the black light blocking layer 120. That is, in the display device 100 according to an example embodiment of the present disclosure, the black light blocking layer 120 is disposed in the non-display area NDA of the display panel 110. Further, the primer layer 130 functioning as a foreign material compensation layer is disposed between the display panel 110 and the black light blocking layer 120. If the primer layer 130 is formed on the display panel 110 before the bezel printing process, the primer layer 130 covers particles remaining on the display panel 110 and thus flattens the surface of the display panel 110. Thus, it is possible to form the black light blocking layer 120, e.g., bezel pattern, having an excellent appearance without coating defects. Further, during the manufacturing process of the display device 100, the primer layer 130 is formed before the bezel printing process. Thus, a cleaning process for removing the foreign materials on the display panel 110 can be omitted, and a separate cleaning process for removing micro foreign materials having the size of about 10 nm or less can also be omitted.

Meanwhile, in the display device 100 according to another example embodiment of the present disclosure, the black light blocking layer 120 may be formed of a cation-curable composition and the primer layer 130 may be formed of a radical-curable composition. As described above, the black light blocking layer 120 may be formed of a radical-curable composition or a cation-curable composition. Particularly, the cation-curable composition is less affected by oxygen and suppresses the curing shrinkage of the black light blocking layer 120 and thus is advantageous over the radical-curable composition.

However, in the cation-curable composition, curing occurs due to oxygen generated by photolysis at a remarkably low curing rate unlike a radical reaction in which fast curing occurs due to radicals generated by photolysis. Particularly, even when light irradiation to the cation-curable composition coated on the display panel is stopped, polymerization continuously proceeds. Thus, if a black light blocking layer is formed of a curable composition, dewetting may occur. In this instance, the black light blocking layer is not formed around micro foreign materials present on a display panel with the lapse of time and the display panel is exposed.

In the display device 100 according to example embodiments of the present disclosure, the thickness d1 of the light blocking layer 120 may be different from the thickness d2 of the primer layer 130. For example, the thickness d1 of the light blocking layer 120 may be greater than the thickness d2 of the primer layer 130. In one example, the thickness d1 of the light blocking layer 120 may be greater than the thickness d2 of the primer layer 130 by 50 to 100 times. Also, a combined thickness of the thickness d1 of the light blocking layer 120 and the thickness d2 of the primer layer 130 may be about 1000 nm to about 10200 nm or more.

Hereinafter, dewetting occurring when a black light blocking layer is formed of a cation-curable composition and a method for solving the dewetting problem in the display device 100 according to an example embodiment of the present disclosure will be described in more detail.

Figure 2:
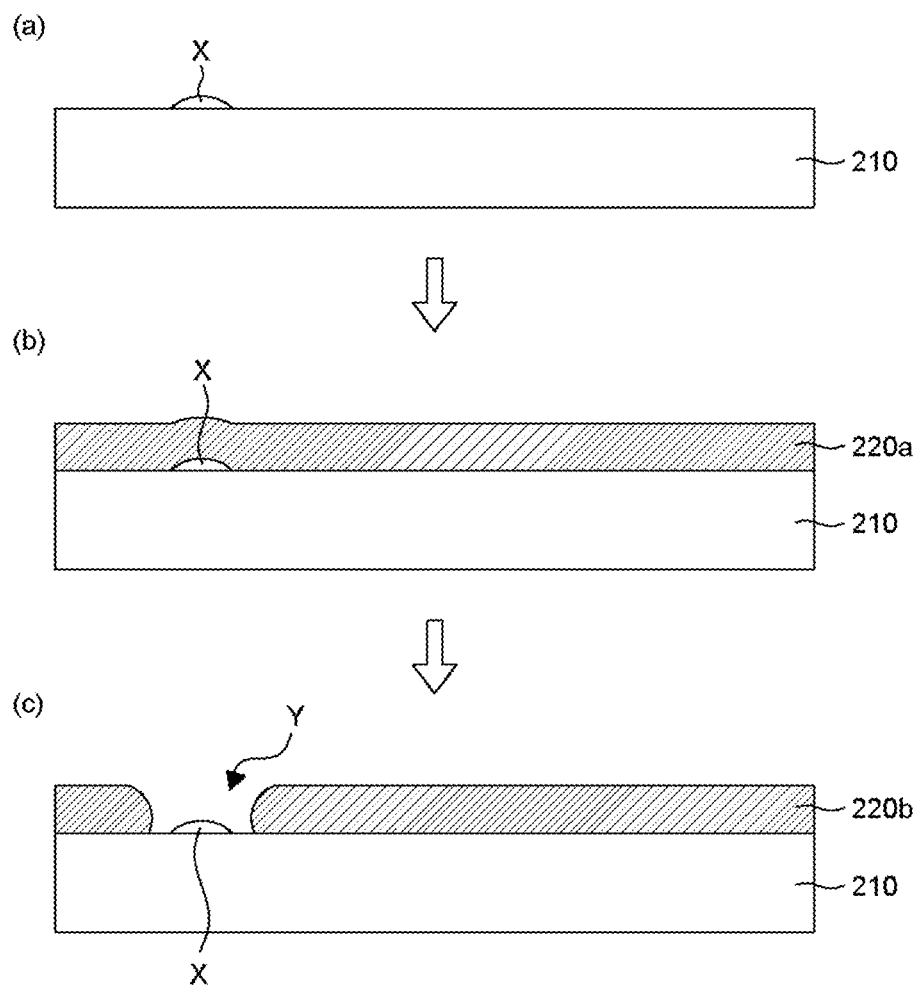
FIG. 2 is a schematic cross-sectional view illustrating dewetting which occurs due to foreign materials during a bezel printing process.
Figure 3:
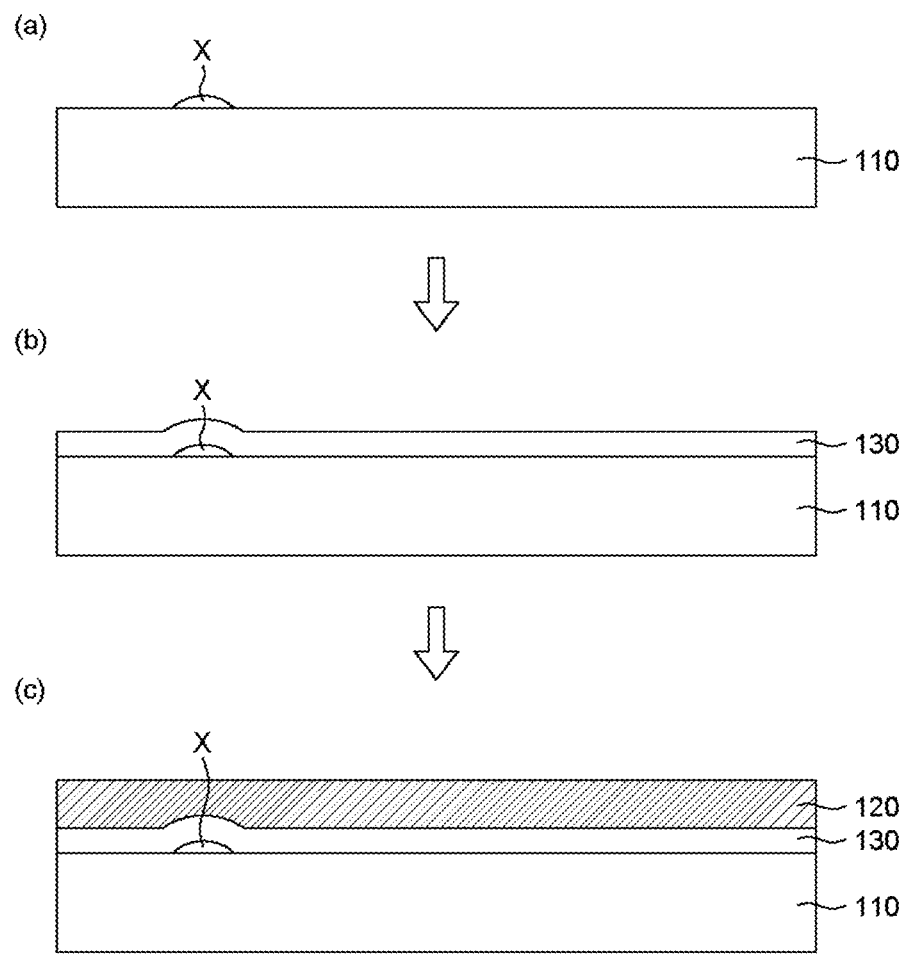
FIG. 3 is a schematic cross-sectional view illustrating a display device on which foreign materials are formed during a bezel printing process according to an example embodiment of the present disclosure.

FIG. 2 is a schematic cross-sectional view illustrating dewetting which occurs due to foreign materials during a bezel printing process. FIG. 3 is a schematic cross-sectional view illustrating a display device on which foreign materials are formed during a bezel printing process according to an example embodiment of the present disclosure.

Referring to (a) of FIG. 2, a micro foreign material X having the size of about 10 nm is present on a display panel 210. In general, the micro foreign material X having the size of about 10 nm or less cannot be easily removed by a cleaning process. Further, during a manufacturing process of a display device, micro foreign materials may be formed in a non-display area of the display panel 210 while the display panel 210 is fixed during various processes.

Then, in (b) of FIG. 2, during a process for forming a black light blocking layer, a cation-curable composition may be coated on the display panel on which the micro foreign material X is present to form a coating layer 220a on the display panel. In this instance, the coating layer 220a fully covers the micro foreign material X. Then, the coating layer 220a is cured by irradiating light thereto, and, thus, a black light blocking layer 220b is formed. However, even after the light irradiation is ended, the coating layer formed of the cation-curable composition is continuously cured. While the curing process is performed, the coating layer on the micro foreign material X cannot cover the micro foreign material X, and, thus, dewetting Y occurs as shown in (c) of FIG. 2. In this instance, the foreign material and a part of the display panel 210 are exposed to air. That is, if the black light blocking layer 220b is formed of the cation-curable composition, coating defects of the cation-curable composition may occur due to the micro foreign material X present on the display panel 210. As a result, the black light blocking layer 220b cannot be uniformly formed, so that a part of the display panel 210 is exposed. That is, defects occur in the black light blocking layer 220b.

However, referring to (a) of FIG. 3, a micro foreign material X having the size of about 10 nm is present on the display device 100 according to an example embodiment of the present disclosure, and as shown in (b) of FIG. 3, the primer layer 130 formed of the radical-curable composition is formed between the black light blocking layer 120 formed of the cation-curable composition and the display panel 110. The primer layer 130 can fully cover the micro foreign material X on the display panel 110, and as shown in (c) of FIG. 3, the black light blocking layer 120 is formed on the primer layer 130. If the cation-curable composition for forming the black light blocking layer 120 is coated on the primer layer 130, the cation-curable composition is not brought into contact with the micro foreign material X. Thus, the cation-curable composition can be uniformly coated on the primer layer 130 without dewetting. Accordingly, it is possible to suppress the occurrence of defects in the black light blocking layer 120.

Figure 4:
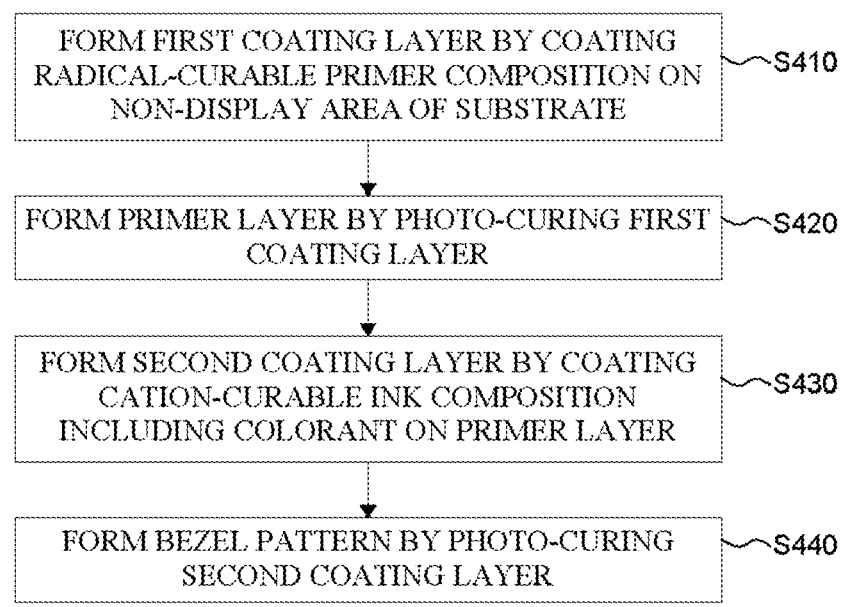
FIG. 4 is a flowchart illustrating a method of manufacturing a display device having a bezel pattern according to an example embodiment of the present disclosure.

FIG. 4 is a flowchart illustrating a method of manufacturing a display device having a bezel pattern according to an example embodiment of the present disclosure. A display device manufactured by the method of manufacturing a display device having a bezel pattern according to an example embodiment of the present disclosure is substantially the same as the display device illustrated in FIG. 1A and FIG. 1B. Therefore, redundant descriptions thereof will be omitted or briefly described.

Referring to FIG. 4, first, a first coating layer may be formed by coating a radical-curable primer composition on a non-display area of a substrate (S410).

The substrate may be a component of a display panel and may be, for example, an upper substrate including a color filter and a cover substrate disposed on the upper substrate to protect the display panel.

The radical-curable primer composition may be coated on the substrate by a conventional coating method. For example, flow coating, dip coating, roll coating, or spray coating may be used, but the present disclosure is not limited thereto. In the present disclosure, spray coating may be mainly used. Particularly, inkjet coating may be used.

In this instance, the first coating may be coated to an appropriate thickness considering a thickness of a primer layer to be formed after the first coating layer is cured. For example, if a cleaning process for removing foreign materials is performed before a bezel pattern is formed, the first coating layer may be formed to a thickness of 200 or less to compensate for micro foreign materials, but is not limited thereto.

The radical-curable primer composition may include a radically polymerizable compound, a radical photoinitiator, and a solvent. The radical-curable primer composition may be the same as described above with reference to FIG. 1A and FIG. 1B. Therefore, redundant descriptions thereof will be omitted or briefly described.

Then, a primer layer may be formed by photo-curing the first coating layer (S420).

The first coating layer formed of the radical-curable primer composition may be cured by absorbing UV rays or visible rays, e.g., light having a wavelength of from about 360 nm to 410 nm. Other wavelengths of light or other sources of energy, such as heat, may also be used.

Light irradiation may be performed using a lamp which is not particularly limited as long as it can regulate the intensity of radiation. The lamp may be, for example, a metal halide lamp, an LED lamp, or a low-pressure/high-pressure mercury lamp. In this instance, the lamp may be installed right behind an inkjet printing head, so that the first coating layer can be formed by printing the radical-curable primer composition with curing.

During the photo-curing, the dose of curing light may be from about 50 mJ/cm$^2$ to about 1500 mJ/cm$^2$ and from about 100 mJ/cm$^2$ to about 1000 mJ/cm$^2$.

Preferably, though not required, the photo-curing for forming the primer layer may be performed for from about 1 second to about 40 seconds.

Then, a second coating layer may be formed by coating a cation-curable ink composition including a colorant on the primer layer (S430).

The cation-curable ink composition may be coated in the same manner as the above-described radical-curable primer composition, and redundant descriptions thereof will be omitted or briefly described.

In this instance, the second coating layer may be coated to an appropriate thickness considering a thickness of a bezel pattern to be formed after the second coating layer is cured. For example, the second coating layer may be formed to a thickness of from about 1 μm to about 10 μm in order for the bezel pattern to completely block light emitted from a display element, but is not limited thereto.

Meanwhile, the cation-curable ink composition may include a colorant, a cationically polymerizable compound, a cationic photoinitiator, and a solvent. The cation-curable ink composition may be the same as described above with reference to FIG. 1A and FIG. 1B. Therefore, redundant descriptions thereof will be omitted or briefly described.

Then, a bezel pattern, e.g., a black light blocking layer may be formed by photo-curing the second coating layer (S440).

The second coating layer may be cured in the same manner or using the same device as the above-described coating layer.

During the photo-curing, the dose of curing light may be from about 50 mJ/cm$^2$ to about 1500 mJ/cm$^2$ and from about 100 mJ/cm$^2$ to about 1000 mJ/cm$^2$.

Preferably, the photo-curing for forming the bezel pattern may be performed for from about 1 second to about 120 seconds.

The second coating layer formed of the cation-curable ink composition maybe cured by cationic polymerization and may be continuously cured even after the photo-curing.

According to the method of manufacturing a display device having a bezel pattern according to an example embodiment of the present disclosure, it is possible to obtain a bezel pattern having an excellent and uniform flatness. Specifically, a primer layer is formed between the bezel pattern and a display panel, and, thus, it is possible to compensate for foreign materials present on the display panel and flatten or planarize the display panel. Therefore, it is possible to suppress defects which may occur during a process for forming the bezel pattern.

Particularly, if the bezel pattern is formed using a cation-curable ink composition, it is possible to solve dewetting of the coated ink composition caused by micro foreign materials having the size of about 10 nm or less remaining after a cleaning process. Therefore, it is possible to form a bezel pattern having excellent surface characteristics. Further, according to the method of manufacturing a display device having a bezel pattern according to an example embodiment of the present disclosure, it is possible to exclude a separate process for cleaning micro foreign materials. Therefore, it is possible to minimize the overall process time and tact.

Hereinafter, the present disclosure will be described in more detail with reference to Examples. However, the following Examples are provided for illustrative purposes only but not intended to limit the scope of the present disclosure.

EXAMPLE

A primer composition including an acryl polymer, a radical photoinitiator, and water with alcohol as a solvent was coated to a thickness of 100 nm on a washed glass substrate by inkjet printing. Then, UV rays of 1000 mJ/cm$^2$ were irradiated for 5 seconds to form a primer layer on the glass substrate. Then, a bezel ink composition including a black pigment, an epoxy polymer, a cationic photoinitiator, and 2-butoxyethyl acetate as a solvent was coated to a thickness of 2 μm on the primer layer by inkjet printing. Then, UV rays of 1000 mJ/cm$^2$ were irradiated for 20 seconds to form a cured bezel pattern on the primer layer.

Comparative Example 1

A bezel ink composition including a black pigment, an epoxy polymer, a cationic photoinitiator, and 2-butoxyethyl acetate as a solvent was coated to a thickness of 2 μm on a washed glass substrate by inkjet printing. Then, UV rays of 1000 mJ/cm$^2$ were irradiated for 20 seconds to form a cured bezel pattern on the glass substrate.

Comparative Example 2

A bezel ink composition including a black pigment, an epoxy polymer, a cationic photoinitiator, and 2-butoxyethyl acetate as a solvent was coated to a thickness of 2 μm on a washed glass substrate by inkjet printing. Then, UV rays of 1000 mJ/cm$^2$ were irradiated for 20 seconds to form a cured bezel pattern on the glass substrate. Then, the bezel ink composition was further coated to a thickness of 1 μm on the cured bezel pattern and irradiated with UV rays of 1000 mJ/cm$^2$ for 20 seconds. Thus, a bezel pattern having a two-layer structure was formed.

Test Example 1

Cross-Sectional Image of Bezel Pattern

Figure 5A:
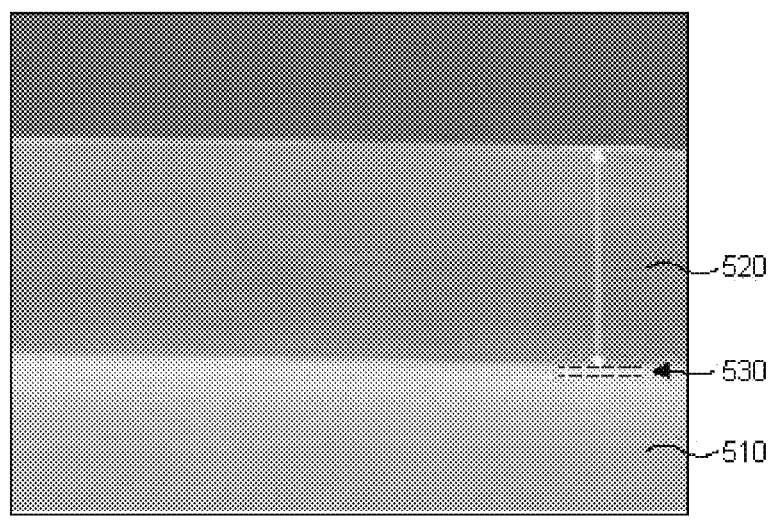
FIG. 5A is an SEM image of a cross-section of a bezel pattern formed according to Example 1.

An 18000× SEM image of a cross-section of the bezel pattern formed according to Example was obtained. FIG. 5A is an SEM image of a cross-section of a bezel pattern formed according to Example 1.

Referring to FIG. 5A, it can be seen that a primer layer 530 having a thickness of about 100 nm is formed on a substrate 510 and a black light blocking layer 520, e.g., bezel pattern, having a thickness of about 2 μm is formed on the primer layer 530.

Test Example 2

Evaluation of Coating Defect of Bezel Pattern

Figure 5B:
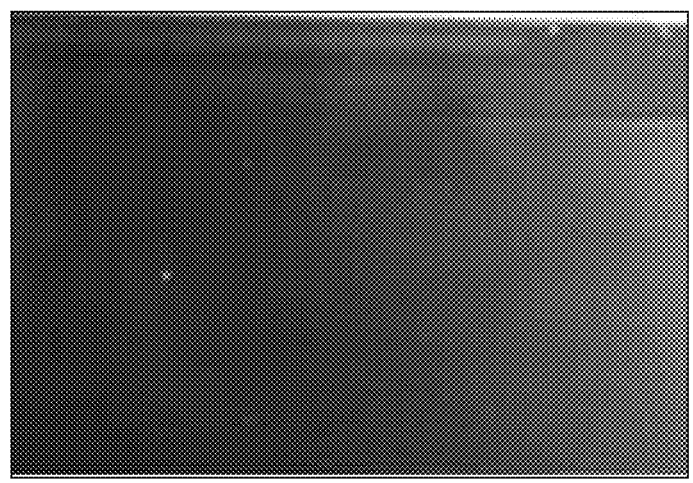
FIG. 5B is an image of a surface of the bezel pattern formed according to Example 1.
Figure 6:
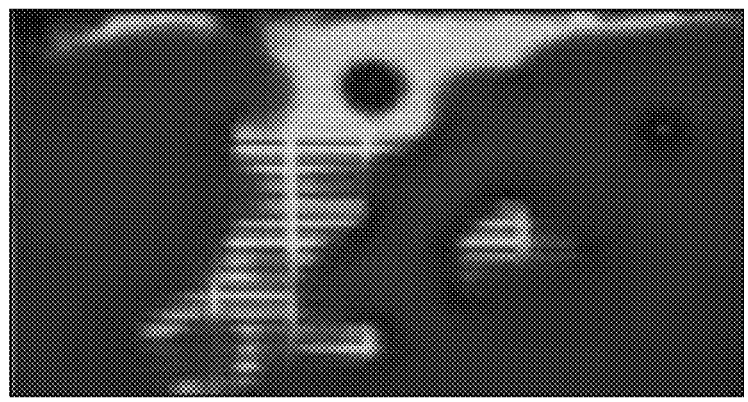
FIG. 6 is an image of a surface of a bezel pattern formed according to a Comparative Example 1.

Images of the bezel patterns formed according to Example, Comparative Example 1, and Comparative Example 2 were captured from a top view. FIG. 5B is an image of a surface of the bezel pattern formed according to Example 1. FIG. 6 is an image of a surface of a bezel pattern formed according to Comparative Example 1, and FIG. 7 is an image of a surface of a bezel pattern formed according to Comparative Example 2.

Referring to FIG. 5B, it can be seen that if a primer layer formed of a radical-curable composition is disposed between a glass substrate and a bezel pattern, a surface of the bezel pattern is uniformly formed without particular defects.

Referring to FIG. 6, if a bezel pattern is formed directly on a glass substrate without a separate primer layer, the bezel pattern cannot be formed in some areas looking spotted. That is, the bezel pattern was not uniformly formed.

Figure 7:
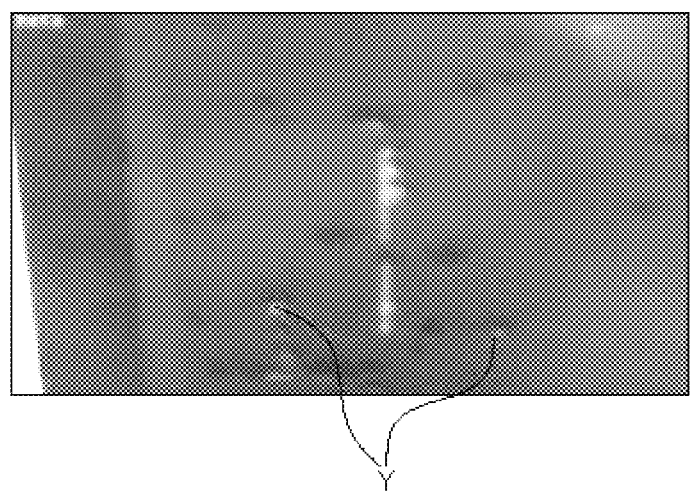
FIG. 7 is an image of a surface of a bezel pattern formed according to Comparative Example 2.

Referring to FIG. 7, it can be seen that if a bezel pattern is formed into a plurality of layers on a glass substrate without a separate primer layer, the bezel pattern is not uniformly formed in some areas. More specifically, a bezel pattern may be formed of a cation-curable ink composition. In this instance, if the bezel pattern is formed into a plurality of layers by coating and curing the ink composition several times, dewetting Y occurs in an area where micro foreign materials are present. Therefore, in this area, the bezel pattern cannot be formed and the glass substrate is partially exposed. In comparison of FIG. 7 with FIG. 5B showing the surface of the bezel pattern formed according to Example, if a primer layer is formed using a radical-curable composition instead of a cation-curable composition before a bezel pattern is formed, dewetting of the bezel pattern around micro foreign materials and exposure of a substrate can be suppressed. Therefore, it is possible to form a uniform bezel pattern having excellent surface characteristics.

The example embodiments of the present disclosure can also be described as follows:

According to an aspect of the present disclosure, a display device includes a display panel including a display area to display an image and a non-display area surrounding the display area. The display device further includes a light blocking layer disposed in the non-display area and on the display panel, and a primer layer disposed between the display panel and the black light blocking layer, and configured to planarize the display panel.

The display device may further include micro foreign materials each having the size of about 10 nm or less, and disposed between the display panel and the primer layer. The primer layer may fully cover the micro foreign materials.

The light blocking layer may have a thickness of about 1 μm to about 10 μm.

The light blocking layer and the primer layer may be formed of a photo-curable composition.

The light blocking layer may be formed of a cation-curable ink composition.

The cation-curable ink composition may include a colorant, an epoxy-based compound, and a cationic photoinitiator.

The primer layer may have a thickness of about 10 nm to about 200 nm.

The primer layer may be formed of a radical-curable composition.

The radical-curable composition may include an acryl-based compound and a radical photoinitiator.

According to another aspect of the present disclosure, a method of manufacturing a display device having a bezel pattern includes preparing a first coating layer by coating a radical-curable primer composition on a non-display area of a substrate. The method of manufacturing a display device having a bezel pattern further includes preparing a primer layer by photo-curing the first coating layer and preparing a second coating layer by coating a cation-curable ink composition including a colorant on the primer layer. The method of manufacturing a display device having a bezel pattern further includes preparing a bezel pattern by photo-curing the second coating layer.

The primer composition may include an acryl-based compound, a radical photoinitiator, and a solvent.

The cation-curable ink composition may include a colorant, an epoxy-based compound, a cationic photoinitiator, and a solvent.

The cationic photoinitiator may be an iodine salt.

According to another aspect of the present disclosure, there is a provided a display device. The display device includes a display panel including a display area to display an image and a non-display area surrounding the display area; micro foreign materials having the size of about 10 nm or less, and disposed on the display panel; and a primer layer disposed on display panel to fully cover the micro foreign materials.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:
   a display panel including a display area to display an image and a non-display area surrounding the display area;
   a light blocking layer disposed in the non-display area and on (he display panel; and
   a primer layer disposed between the display panel and the light blocking layer, and configured to planarize the display panel,
   wherein the light blocking layer is formed of a cation-curable ink composition,
   wherein the primer layer is formed of a radical-curable composition, and
   wherein the primer layer is formed in the non-display area of the display panel.

2. The display device according to claim 1, further comprising:
   micro foreign materials each having a size of about 10 nm or less, and disposed between the display panel and the primer layer,
   wherein the primer layer fully covers the micro foreign materials.

3. The display device according to claim 1, wherein the light blocking layer has a thickness of about 1 μm to about 10 μm.

4. The display device according to claim 1, wherein the cation-curable ink composition includes a colorant, an epoxy-based compound, and a cationic photoinitiator.

5. The display device according to claim 1, wherein the primer layer has a thickness of about 10 nm to about 200 nm.

6. The display device according to claim 1, wherein the radical-curable composition includes an acryl-based compound and a radical photoinitiator.

7. A method of manufacturing a display device having a bezel pattern, the method comprising:
   preparing a first coating layer by coating a radical-curable primer composition on a non-display area of a substrate;
   preparing a primer layer by photo-curing the first coating layer;
   preparing a second coating layer by coating a cation-curable ink composition including a colorant on the primer layer; and
   preparing a bezel pattern by photo-curing the second coating layer.

8. The method of manufacturing a display device having a bezel pattern according to claim 7, wherein the primer composition includes an acryl-based compound, a radical photoinitiator, and a solvent.

9. The method of manufacturing a display device having a bezel pattern according to claim 7, wherein the cation-curable ink composition includes a colorant, an epoxy-based compound, a cationic photoinitiator, and a solvent.

10. The method of manufacturing a display device having a bezel pattern according to claim 9, wherein the cationic photoinitiator is an iodine salt.

11. The method of manufacturing a display device having a bezel pattern according to claim 9, wherein micro foreign materials each having a size of 10 nm or less are present on the substrate, and
    wherein the primer layer fully covers the micro foreign materials after the photo-curing of the first coating layer.

12. A display device, comprising:
    a display panel including a display area to display an image and a non-display area surrounding the display area;
    micro foreign materials having a size of about 10 nm or less, and disposed on the display panel;
    a primer layer disposed on the display panel to fully cover the micro foreign materials; and
    a light blocking layer on the primer layer in the non-display area, and on the display panel,
    wherein the light blocking layer is formed of a cation-curable ink composition,
    wherein the primer layer is formed of a radical-curable composition, and
    wherein the primer layer is formed in the non-display area of the display panel.

13. The display device according to claim 12, wherein a thickness of the light blocking layer is different from a thickness of the primer layer.

14. The display device according to claim 12, wherein a thickness of the light blocking layer is greater than a thickness of the primer layer.

15. The display device according to claim 12, wherein a thickness of the light blocking layer is about 1 μm to about 10 μm, and wherein a thickness of the primer layer is about 10 nm to about 200 nm.

16. The display device according to claim 12, wherein the primer layer includes an acryl-based compound, a radical photoinitiator, and a solvent, and wherein the light blocking layer includes a colorant, an epoxy-based compound, and a cationic photoinitiator.

\* \* \* \* \*